United States Patent
McMillian et al.

(10) Patent No.: US 10,450,091 B2
(45) Date of Patent: Oct. 22, 2019

(54) PACKAGE ACCEPTANCE, GUIDANCE, AND REFUEL SYSTEM FOR DRONE TECHNOLOGY

(71) Applicant: DroneTerminus LLC, Boca Raton, FL (US)

(72) Inventors: Joseph Barry McMillian, Boca Raton, FL (US); Mark Messina, Carlsbad, CA (US); Paul Caprioli, Hillsboro, OR (US)

(73) Assignee: DroneTerminus LLC, Boca Raton, FL (US)

( * ) Notice: Subject to any disclaimer, the term of this patent is extended or adjusted under 35 U.S.C. 154(b) by 0 days.

(21) Appl. No.: 15/946,376

(22) Filed: Apr. 5, 2018

(65) Prior Publication Data
US 2018/0290764 A1 Oct. 11, 2018

Related U.S. Application Data

(60) Provisional application No. 62/483,192, filed on Apr. 7, 2017.

(51) Int. Cl.
*B64F 1/32* (2006.01)
*G08G 5/04* (2006.01)
(Continued)

(52) U.S. Cl.
CPC ............ *B64F 1/32* (2013.01); *B64C 39/024* (2013.01); *B64D 45/04* (2013.01); *G06Q 10/083* (2013.01); *G08G 5/0013* (2013.01); *G08G 5/0026* (2013.01); *G08G 5/0039* (2013.01); *G08G 5/0065* (2013.01); *G08G 5/0069* (2013.01);
(Continued)

(58) Field of Classification Search
CPC ... B64F 1/32; B64C 39/024; B64C 2201/128; B64C 2201/18; B64D 45/04; G06Q 10/083; G08G 5/0013; G08G 5/0026; G08G 5/0039; G08G 5/0065; G08G 5/0069; G08G 5/0082; G08G 5/0086; G08G 5/0091;
(Continued)

(56) References Cited

U.S. PATENT DOCUMENTS 5,657,009 A * 8/1997 Gordon .............. G01C 23/005
340/968
9,087,451 B1 * 7/2015 Jarrell .................. G08G 5/0069
(Continued)

FOREIGN PATENT DOCUMENTS

EP 1 767 453 A1 3/2007
EP 3 043 331 A2 7/2016
(Continued)

OTHER PUBLICATIONS

Faheem, UAV Emergency Landing Site Selection System using Machine vision (Year: 2016).*
(Continued)

*Primary Examiner* — Angelina Shudy
(74) *Attorney, Agent, or Firm* — Cooley LLP

(57) ABSTRACT

Some embodiments described herein relate to a drone landing platform. One or more sensors coupled to the drone landing platform can detect local conditions in the vicinity of the drone landing platform. A communications system can be operable to transmit information related local conditions to a drone.

29 Claims, 9 Drawing Sheets

(51) Int. Cl.
*B64C 39/02* (2006.01)
*B64D 45/04* (2006.01)
*G06Q 10/08* (2012.01)
*G08G 5/00* (2006.01)
*G08G 5/02* (2006.01)
*A47G 29/14* (2006.01)

(52) U.S. Cl.
CPC ......... *G08G 5/0082* (2013.01); *G08G 5/0086* (2013.01); *G08G 5/0091* (2013.01); *G08G 5/025* (2013.01); *G08G 5/045* (2013.01); *A47G 29/141* (2013.01); *A47G 2029/149* (2013.01); *B64C 2201/128* (2013.01); *B64C 2201/18* (2013.01)

(58) Field of Classification Search
CPC ...... G08G 5/025; G08G 5/045; A47G 29/141; A47G 2029/149
USPC .......................................................... 701/3
See application file for complete search history.

(56) References Cited

U.S. PATENT DOCUMENTS

| | | | |
|---|---|---|---|
| 9,359,074 B2* | 6/2016 | Ganesh | G08G 5/0069 |
| 9,387,928 B1 | 7/2016 | Gentry et al. | |
| 2015/0158598 A1 | 6/2015 | You | |
| 2015/0158599 A1 | 6/2015 | Sisko | |
| 2016/0257401 A1* | 9/2016 | Buchmueller | B64C 39/024 |
| 2017/0004714 A1* | 1/2017 | Rhee | G08G 5/0082 |
| 2017/0015438 A1 | 1/2017 | Harding et al. | |
| 2017/0032315 A1* | 2/2017 | Gupta | G06Q 10/08 |
| 2017/0205827 A1* | 7/2017 | Rezvani | G05D 1/0022 |
| 2017/0337826 A1* | 11/2017 | Moran | G01S 1/042 |
| 2017/0344000 A1* | 11/2017 | Krishnamoorthy | B64C 39/024 |
| 2018/0025650 A1* | 1/2018 | Taveira | G08G 5/006 701/3 |
| 2019/0014461 A1* | 1/2019 | Winkle | G08G 5/0056 |

FOREIGN PATENT DOCUMENTS

WO  WO 2015/160672 A1  10/2015
WO  WO 2016/122780 A1  8/2016

OTHER PUBLICATIONS

International Search Report and Written Opinion dated Jul. 19, 2018 for International Application No. PCT/US2018/026473, 16 pages.

* cited by examiner

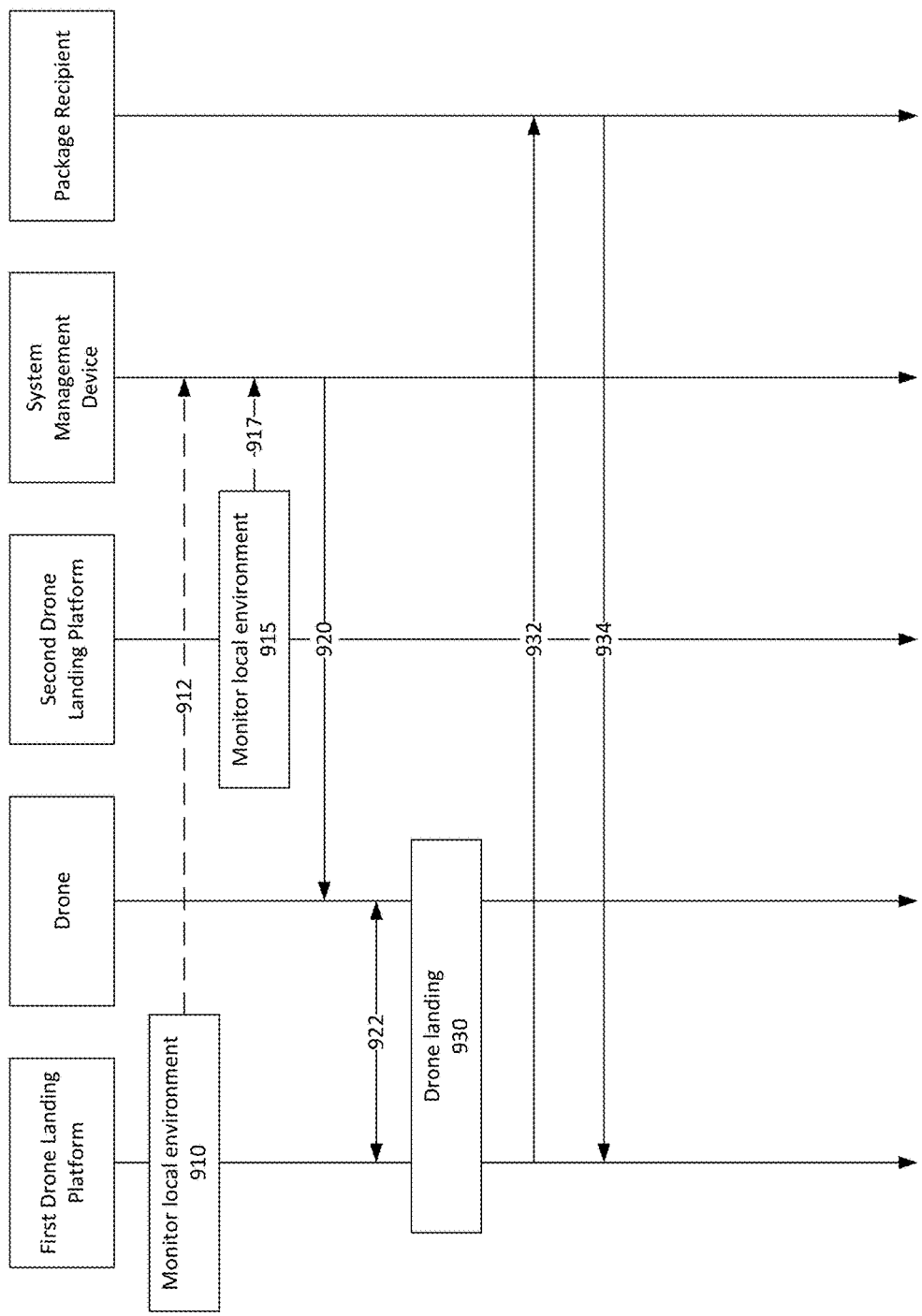

PACKAGE ACCEPTANCE, GUIDANCE, AND REFUEL SYSTEM FOR DRONE TECHNOLOGY

CROSS REFERENCE TO RELATED APPLICATION

This application claims priority to U.S. Patent Application No. 62/483,192, filed Apr. 7, 2017, the entire disclosure of which is hereby incorporated by reference in its entirety.

TECHNICAL FIELD

The present disclosure relates to drone delivery technology. More particularly, the present invention describes drone specific endpoint package delivery appliances, drone control and guidance systems, and drone refueling systems and technology.

BACKGROUND

The pursuit of drone delivery technology for private and commercial package delivery purposes presents numerous challenges, including:
1. Range and Payload: Battery and propulsion systems' size and weight limit the maximum range and payload capacity of drone delivery systems. This is especially true for unmanned aerial vehicles (UAV), which are also referred to herein as "drones". Increases to size and/or weight reduce efficiency and increase cost, and reductions in range and/or payload capacity lower the business value of the drone delivery system.
2. Operating Conditions: Range and success of drone delivery is impacted by adverse weather as well as by normal winds. Additionally, hazard avoidance, flight adjustments, system rerouting and/or obstacles impact flight time. A particular challenge exists ensuring that a drone is able to complete both delivery and return when atypical conditions cause a drone to deviate from pre-planned paths.
3. Disabled Drones: Known systems are generally unequipped to handle software, propulsion system, navigation, or other system error. In the event a known drone becomes disabled, known drones may seek a random location to land.
4. Verified Delivery: Some known drone delivery systems leave packages near doorsteps or in other insecure locations at the delivery destination without verifiable confirmation of package delivery, which erodes customer confidence and increases operator exposure to fraud. Recipients of packages delivered using known drone technology cannot confirm that a package has been successfully delivered (to their correct address) upon receiving a shipper's notice of delivery.
5. Package Security: Packages left in the open are subject to theft, weather, etc. Goods may be sensitive to light, temperature, humidity, etc.
6. Guidance: Drones are generally enabled with a suite of sensors, including GPS, vision, lidar, etc. These onboard components are necessarily a compromise among the competing considerations of efficacy/capability, power consumption, and weight.
7. Obstacle Avoidance: The "last mile delivery" of the package to the customer is the most challenging step of the delivery process. It is during this phase that obstacles are most varied and difficult to detect. Humans and animals offer additional challenges and, for safety reasons, collision avoidance is a top priority. Known systems that involve drones spending, for example, only minutes at a residential delivery location have no long-term knowledge or visibility into the patterns and rhythms of local conditions and are therefore unable to effectively recognize or predict hazardous conditions.
8. Communication: Drones leverage a variety of communication methods, including, for example, LTE and 5G. However, service is not uniformly available everywhere in the world or even in the United States.

SUMMARY OF THE INVENTION

Embodiments described herein address challenges present in known drone delivery systems. Some embodiments described herein relate to a drone Package Acceptance, Guidance, and Refuel (PAGR) appliance at one or more delivery destinations and/or along travel routes used by drone operators. PAGR appliances are also referred to herein as drone landing platforms. Embodiments described herein generally relate to the delivery of consumer packages by commercial businesses, the return of packages to commercial businesses, and/or peer-to-peer package delivery. PAGR appliances can be customized for a particular deployment area, such as residential, commercial, industrial, urban, suburban, rural environments, etc. Similarly stated, various features or modules described herein can be included and/or omitted from a PAGR appliance to tailor a given PAGR appliance to the local environment.

In some embodiments, a secure and/or controlled receptacle is provided. In this way, PAGR appliances can securely store packages deposited by people and/or drones and allow such packages to be retrieved by people and/or drones. In some embodiments, a customer electronically sign or otherwise accept a package after being presented with an electronic image of its arrival. These features enhance customer confidence and reduce the PAGR appliance's operator's exposure to fraud.

In various embodiments, an information and guidance system module collects sensor and customer data and provides one-way and/or bi-directional information exchange with a drone. For example, data is provided regarding local conditions such as wind-speed, obstacle detection, customer delivery preferences, such as preferred delivery location or package refusal, view from the ground, and micro-positioning of an UAV during landing. Machine learning may permit the PAGR appliance to adapt and respond to local conditions. These features enable safe and successful package delivery, enhance customer perception, and reduce drone operator liability exposure.

In various embodiments, a refueling module provides an electric charging service to drones. The system capacity and range of a drone fleet may be extended incrementally by using strategically located appliances to refuel the drone. Furthermore, the capability to refuel a drone en route allows for greater flexibility in reacting to traffic congestion, hazards, and adverse operating conditions.

BRIEF DESCRIPTION OF THE DRAWINGS

FIG. 10 is a signal diagram illustrating a method of operating a system that includes one or more drone landing platforms and a drone, according to an embodiment

DETAILED DESCRIPTION OF THE INVENTION

A PAGR appliance or drone landing platform can contains various modules and supporting technologies that can provide one or more services to drones and/or package recipients.

Some embodiments described herein relate to a drone landing platform. One or more sensors coupled to the drone landing platform can detect local conditions in the vicinity of the drone landing platform. A communications system can be operable to transmit information related local conditions to a drone.

Some embodiments described herein relate to a drone landing platform that includes a package storage receptacle. The package storage receptacle can be operable to receive a package from a drone that has landed on the drone landing platform. A verification system can be operable to identify a user and provide the user access to the package. One or more sensors coupled to the drone landing platform can detect transient hazards the vicinity of the drone landing platform. A transmitter can send indications of transient hazards to a drone.

Some embodiments described herein relate to a method that includes receiving a request to deliver a package from a drone. The request can include an indication of a recipient of the package. A sensor coupled to a drone landing platform can be operable to detect local conditions in a vicinity of the drone landing platform. An indication of local conditions can be sent to the drone. The drone can be directed to land on the drone landing platform based on the local condition. In some embodiments, the drone and the drone landing platform can engage in two-way communication and negotiate, for example, alternate landing sites, emergency actions, and so forth based on the local condition.

Figure 1:
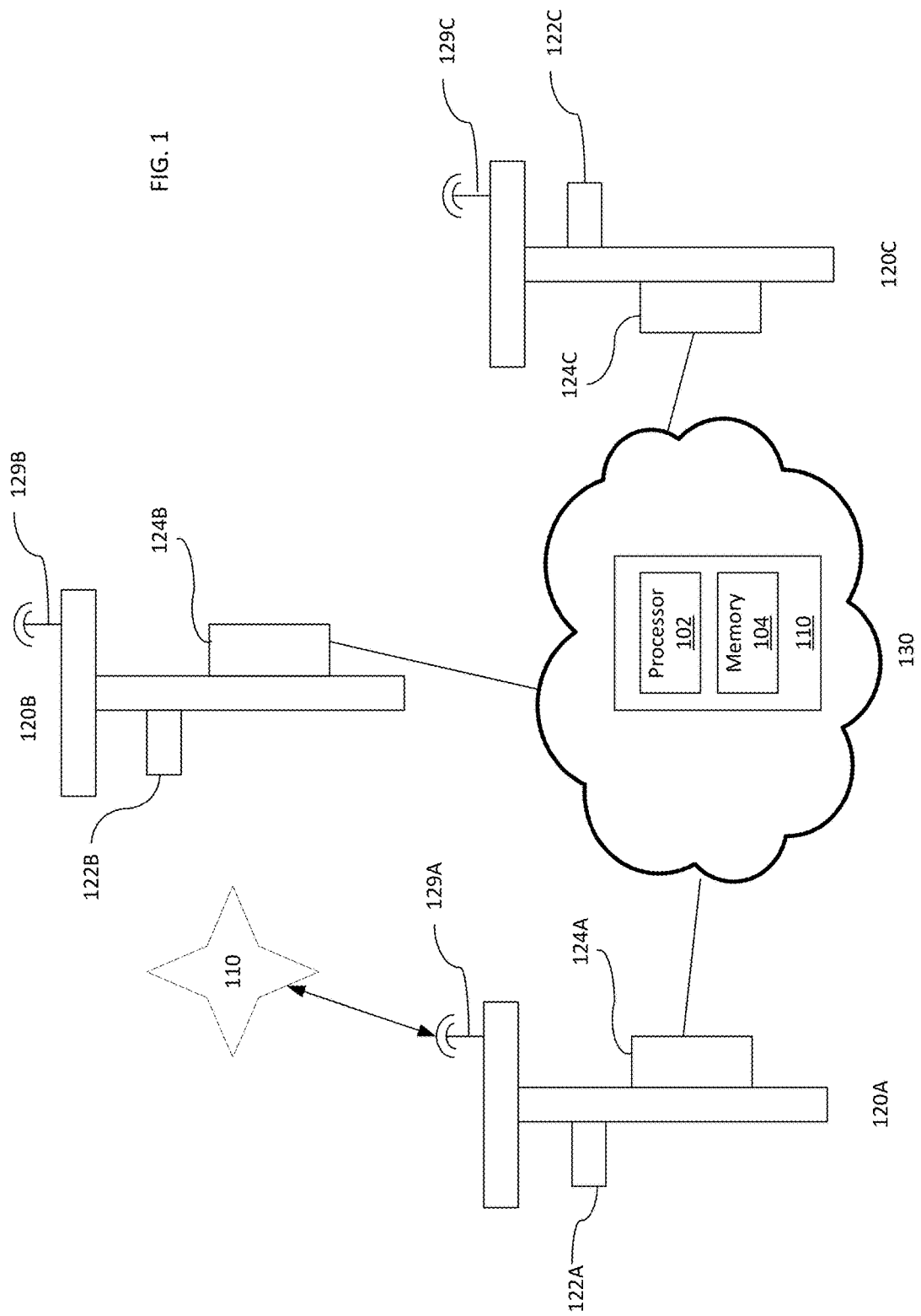
FIG. 1 is a schematic system diagram including multiple drone landing platforms, according to an embodiment.

FIG. 1 is a schematic diagram of a system including multiple drone landing platforms 120 (120A, 120B, 120C). The drone landing platforms 120 each include one or more sensors 122 (122A, 122B, 122C). The sensors 122 can include, for example, radar, lidar, optical sensors (e.g., cameras), acoustic sensors, sensors configured to monitor radio traffic associated with WiFi, sensors configured to monitor drone communication, sensors configured to monitor air traffic control, and/or so forth. In this way each drone landing platform 120 can monitor local conditions in its vicinity. As used herein, "local conditions" and "vicinity" generally refer to aspects of a site (weather, traffic, topography, etc.) that can be detected via sensors physically located at the site of a drone landing platform. Such sensors typically have a range of less than 1,000 feet and therefore the vicinity of a drone landing platform can be understood as the area within 1,000 feet of the platform. It should be understood, however, local conditions of any other suitable area, such as within 2,500 feet, within 750 feet, within 1000 feet, etc. can be monitored by sensors physically located at the site of a drone landing platform. Notably, local sensors may provide more accurate description of local events than data received from remote sources such as aerial or satellite imagery, weather radar, remote weather stations, and the like.

Each drone landing platform 120 can include a radio 129 (129A, 129B, 129C) or other suitable communication device operable to engage in one-way and/or bi-directional communication with the drone 110. In some embodiments, as the drone approaches drone landing platform 120A, the drone landing platform 120A can send information related to local conditions to the drone 110. Furthermore, in some embodiments, drone landing platform 120A can send landing instructions, such as a flight path to the drone 110. Alternatively, the drone landing platform 120A can control the drone 110 while the drone is in the drone landing platform's vicinity, while the drone 110 is landing at the drone landing platform 120A, and/or while the drone is taking off from the drone landing platform 120A.

Known drones, typically rely on autonomous on-board control or real-time controls sent by a human operator. Such known drones, therefore generally rely on data received from on-board sensors or the human operator's perceptions. Embodiments described herein allow a drone's onboard sensors and on-board controller to be supplemented with and/or superseded by sensors and/or controllers of drone landing platforms 120. Drone landing platforms 120 are generally not subject to the strict weight and power constraints that drones are, and can therefore include more robust sensing capability, route planning, and so forth. Thus, drone landing platform 120A sending data associated with local conditions, sending flight path data, and/or controlling drone 110 via radio 129A can result in improved situational awareness, more accurate information, and/or so forth, which can improve flight safety and/or efficiency.

As shown in FIG. 1, a system can include multiple drone landing platforms 120. Each drone landing platform 120 can gather data regarding local conditions at a different site. Each drone landing platform 120 can also include a network device 124 (124A, 124B, 124C). The network devices 124 can communicatively couple the drone landing platforms 120 to each other, to a network 130 and/or to a system management device 110. The network devices 124 can each be any suitable communication device, such as a WiFi device, a Bluetooth device, a cellular radio or cellular phone, etc. The network 130 can be any suitable wired or wireless network, including the internet, an intranet, and so forth.

System management device 110 is a computing entity (e.g., a server, a cloud service, computer(s), laptop(s), tablet(s), smartphone(s), or the like etc.) and includes a processor 102 and a memory 104. The processor 102 can be, for example, a general-purpose processor, a Field Programmable Gate Array (FPGA), an Application Specific Integrated Circuit (ASIC), a Digital Signal Processor (DSP), and/or the like. The processor 102 can be configured to retrieve data from and/or write data to memory, e.g., the memory 104, which can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth.

In some embodiments, the system management device 110 is operable to send and receive signals to drones (e.g., drone 110). For example, the system management device 110 can be associated with a package storage center and/or drone hanger and can be operable to identify packages for delivery, identify delivery destinations, instruct a drone to deliver a package to a destination, and so forth.

In some embodiments, the system management device 110 is operable to receive data from the drone landing platforms 120. In this way, the system management device 110 can assemble multiple local data sources to compile a mosaic of detailed local information. The system management device 110 can apply machine learning techniques described in further detail herein to identify local transient and/or hazardous configurations and reroute drones to alternate destinations. For example, system management device 110 can identify drone landing platform 120A as closest to a recipient and dispatch drone 110 containing a package intended for the recipient to drone platform 120A. Subsequently, sensor 122A can detect a hazardous condition in the vicinity of drone landing platform 120A (e.g., high winds, fallen tree branch, people in the area, etc.). Drone landing platform 120A and/or system management device 110 can recognize the hazard and send a signal to the drone 110 to advise the drone of the hazard, alter route instructions for the drone, instruct the drone to make an emergency landing, reroute the drone to another drone landing platform (e.g., drone landing platform 120B), return to base, and/or any other suitable action.

In some embodiments some or all functions of the system management device 110 can be decentralized and performed at one or more of the drone landing platforms 120. For example, some or all drone landing platforms 120 can include a processor and memory and be operable to recognize local hazards (e.g., using machine learning or other suitable technique), calculate routes that account for local hazards, reroute drones to other drone landing platforms, etc.

The drone landing platforms 120 can include a PAGR-PIS (Package Interaction System) module, a mechanical device that receives and presents packages to drones. The PAGR-PIS module can include, for example, motorized doors and/or conveyors that are operated by a computer or microcontroller to provide safe and synchronized delivery of packages to and from the PAGR appliance. Various doors, elevators, and conveyors can be configured for various instance of the appliance. The PAGR-PIS may be bi-directional and may present or receive packages to or from the user, and it may present or receive packages to or from a delivery drone.

The drone landing platforms 120 can include a PAGR-THRM module, an electro-thermal temperature control system. The PAGR-THRM module can be fitted to the package storage area and include electro-thermal controls and insulation, as well as sensors to provide control and feedback for communication to the operator. Climate control allows for storage of perishables such as groceries and/or medical goods such as insulin.

The drone landing platforms 120 can include a PAGR-PSS (Package Storage System) module, a secure bay to store packages until they are released to the receiver (package recipient and/or drone). This module can include a container that a user can access, but which may be isolated from the conveyor system for safety and security purposes. This portion of the system may utilize cameras for visual feedback and electromechanical locking elements to secure the doors. The storage area can be locked; a user can retrieve a package via interaction with the PGPR-PSS via a smart phone app, with a key, code, and/or through other suitable authentication mechanism. For example, in some embodiments, the user may be authenticated biometrically (e.g., via a fingerprint scanner, facial recognition, etc.), such biometric identification can facilitate the delivery of alcohol or medications containing controlled substances by satisfying legal requirements and avoiding illegal diversion or inadvertent delivery to minors.

In some embodiments a drone landing platform 120 can support a single user or household and can be configured to allow only that single user, single household, or others authorized by the single user/household to deposit and/or retrieve packages. In other embodiments, a drone landing platform 120 can support any number of users, and users can be added/removed as authorized on a per package and/or per delivery basis. For example, 10 cubic feet of package storage may be provided in embodiments for small residential units, 1,000 cubic feet of storage for rural way-points, or 3,000 cubic feet or more of storage with multiple retrieval access points in embodiments for urban high-density residential locations.

The drone landing platforms 120 can include a PAGR-PVS (Package Verification system) module, a camera, RFID, or other suitable system operable to verify labels, bar-codes, RFID tags, or other suitable identifier on packages in the PAGR appliance. The PVS may use low lux capable cameras and IR lighting to detect and verify the shape, size, and/or other physical attributes and/or identifying features of a package. The PVS may utilize optical character recognition to interpret writing on the package. Any or all of the collected information, including an image of the package, may be provided to a user (e.g., via multimedia messaging (MMS) or a notification through an app installed on the user's smartphone) and can facilitate electronic package acceptance. The user's cryptographically secure signature or other suitable authorization may subsequently be provided to the drone operator and/or the package sender to establish and/or verify delivery.

The drone landing platforms 120 can include a PAGR-DRS (Drone Refuel System), a refueling module on the PAGR appliance, which can use an inductive charging technology and/or other suitable charging interface. The DRS can provide drone specific voltage and current based on communication with the drone or drone operator. The drone can communicates a desired charge voltage and/or current, and the DRS controller can provide the appropriate energy through the charging interface. In addition or alternatively, the PAFR-DRS may be operable to allow drones to swap partially depleted batteries with batteries storing a greater charge.

Refueling capability may be selectively offered to drones for a fee. The fee may be negotiated in advance, for example in dollars per Watt-hour, or a retail supplier or drone delivery service may offer such things as free package delivery in exchange for no cost refueling. The fee may be negotiated automatically, such as via an online auction among drones and PAGR appliances. As an example, a PAGR appliance equipped with solar charging and having a full battery may offer drones less expensive rates than others in the area. Or, a PAGR appliance, at the owner's preference, may be configured to offer lower (or zero) cost refueling to hobbyists, academic researchers, non-profits, and/or emergency service drones. Where applicable, such charitable contributions may be recorded by the PAGR appliance for tax and other purposes.

The sensors 122 can be a component of a PAGR-DIGS (Drone Information and Guidance System), which can provide environmental information, such as wind speed and direction, as well as simultaneous localization and mapping (SLAM) guidance to UAV drones during the line of sight portion of its flight. Guidance information may be provided by lidar, vision, Ultra-Wide Band (UWB), and/or other suitable technology. These technologies may be provided as a single lower-cost device, or may be embedded about the perimeter of a larger appliance to provide a 360-degree field of view, including 3D depth information. Using sensor fusion, the appliance may detect objects both at rest and in motion. A ground-up "eye on the sky" view can be provided to a drone, including summary information such as distance, compass heading, altitude, and angle of approach in both the horizontal and vertical planes. Thus, drone 110 interfacing with a PAFR-DIGS equipped drone landing platform, may have significantly more information regarding the area and landing site than a typical autonomous drone. Using computer vision processing, the DIGS may apply algorithms to plot flight paths and/or assess risks to the incoming drone. In some embodiments, the drone landing platform 120 can take control of the drone 110 and/or coordinate with the drone 100 to plan the drone's flight path. In some embodiments, when a risk and/or hazard is detected, the drone landing platform 120 can issue (via IR, Wi-Fi, 5G wireless, etc.,) a wave off command to the drone 110, optionally including data about the threat so the drone 110 can respond with the safest exit path.

The PAGR-DIGS module and/or the system management device 110 can use machine learning to recognize usual patterns in the local environment and may therefore better detect and respond to exceptional, periodic, and/or transient hazards and events. For example, by learning the typical features of the landscape in the vicinity of drone landing platform over time, the PAGR-DIGS module may recognize a hazard, such as a child playing in the flight area, and provide warning to an incoming drone or delay the takeoff of a departing drone. As another example, the system management device 110 can predict future hazards based on patterns of past hazards. In this way, the PAGR-DIGS module can be operable to alert a drone of predicted future hazards.

The PAGR appliance can inter-operate with, or subsume, the functions of a home or other suitable security system. The PAGR-DIGS module can notify a property owner(s) in the vicinity of the drone landing platform 120 of unusual events in real time and/or record sensor data, allowing property owner(s), drone owner(s), and/or owner/operators of the drone landing platform 120 to review the data.

The PAGR-DIGS module can process information locally on the device itself, upload data, for example to the cloud (e.g., network 130), for remote processing (e.g., at system management device 110), or perform any combination thereof. In addition to the analysis already described, processing can include data compression, encryption, and/or processing for privacy, such as the obscuring of faces and other features of humans in the field of view.

The PAGR appliance can negotiate with drones and allow them to remain on site (off the road, on the ground) if they so wish, possibly for a fee or other consideration. For example, a PAGR appliance can send a signal to a drone authorizing the drone to remain in the vicinity of the PAGR appliance and/or "parked" on a drone landing platform. A drone may be allowed safe haven during adverse weather events, or a malfunctioning drone may be retrieved by ground personnel. With permission from the PAGR appliance, a drone may choose to delay departure based on traffic congestion on the road or in the air as applicable or at the next destination in order to optimize its delivery pattern. A drone may be permitted to use the area to transfer or exchange payloads with other drones.

The drone landing platform 120 can include a PAGR-CS (communication system) that can allow users to approach the PAGR and interact with the drone landing platform/PAGR appliance directly. A variety of information can be exchanged using this method. Using Bluetooth, NFC, or other suitable technology, interaction with the PAGR appliance may be accomplished by simply touching the PAGR appliance or connecting to it via Bluetooth technology. A variety of information can be communicated to the user by the PAGR appliance, including acknowledgment of delivery, duration of storage, storage temperature, etc. Furthermore, tracking, software patches, navigation updates, and so forth can be transmitted to drones via drone landing platforms. As discussed above, flight plans, including information related to new hazards can be transmitted to the drone in real time. Health monitoring, battery status, and software updates of the drone landing platform and/or drones can all be transmitted to a fleet operator.

The drone landing platform 120 can include a PAGR-BEAC (beacon) module, a communications radio frequency beacon connecting unmanned aircraft systems (UAS) to the NASA/FAA's unmanned traffic management (UTM) system. In this way, the drone landing platform 120 can participate in the traffic control system for autonomous drone location and status communication, which can enable collaborative communication and navigation among drones.

It should be understood that various embodiments can have different combinations of the features described above. For instance, an embodiment of a PAGR appliance may be realized entirely in software and utilize sensor systems already available in a home, such as the cameras of a home security system. In such an embodiment the drone landing platform 120 may not actually contain a physical platform, but instead may use a lawn or other suitable landing space as the "platform." In one embodiment, a mobile phone application can allow a user to order a delivery to his current location, with the phone's cameras and sensors providing information and guidance to the drone and following the package acceptance protocol described herein. Moreover, FIG. 1 depicts multiple drone landing platforms 120A, 120B, 120C; it should be understood that each drone landing platform can include different features and/or combinations of features.

Figure 2:
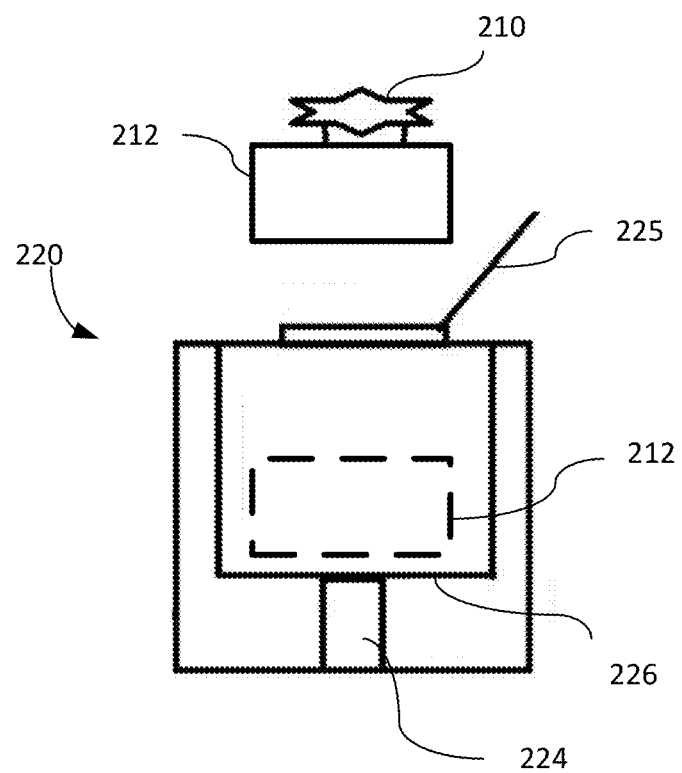
FIG. 2 is a block diagram of an exemplary PAGR appliance with a UAV drone delivery in progress.

FIG. 2 depicts a drone landing platform 220 equipped with a Package Storage System (PAGR-PSS) module and a platform 226 that elevates to receive a package pod 212 from a drone 210. A door 225 in the top of the appliance may open to allow the package pod 212 to be accepted from the drone 210 into the PAGR-PSS module and/or to present a package pod 212 to the drone 210 for pick up. When not accepting or delivering a package pod 212, the door 225 can be closed to secure the package pod 212 inside the PAGR-PSS module.

An access terminal 224 can verify a user's (e.g., a recipient of the package pod 212) identity. Upon verifying that the user is authorized, the access terminal 224 can open door 225, elevate the platform 226, and/or otherwise allow the user to retrieve the package pod 212. In addition or alternatively, the access terminal 224 can be used by a user dropping off a package pod 212. In such an instance, the user may identify the package, the recipient, or any other pertinent information, and the PAGR-PSS module can accept the package pod 212 and store it until a drone is available to deliver the package pod 212 to an appropriate destination.

In some instances, the drone landing platform 220 can be installed on a rooftop and/or pole and may be elevated 10 feet or any other suitable distance over ground level. In some embodiments, the drone landing platform 200 can be configured to receive, store, and/or provide a drone 210 packages or pods 212 having standard dimensions (e.g., 2 feet×2 feet×1 foot, or any other suitable size).

Figure 3:
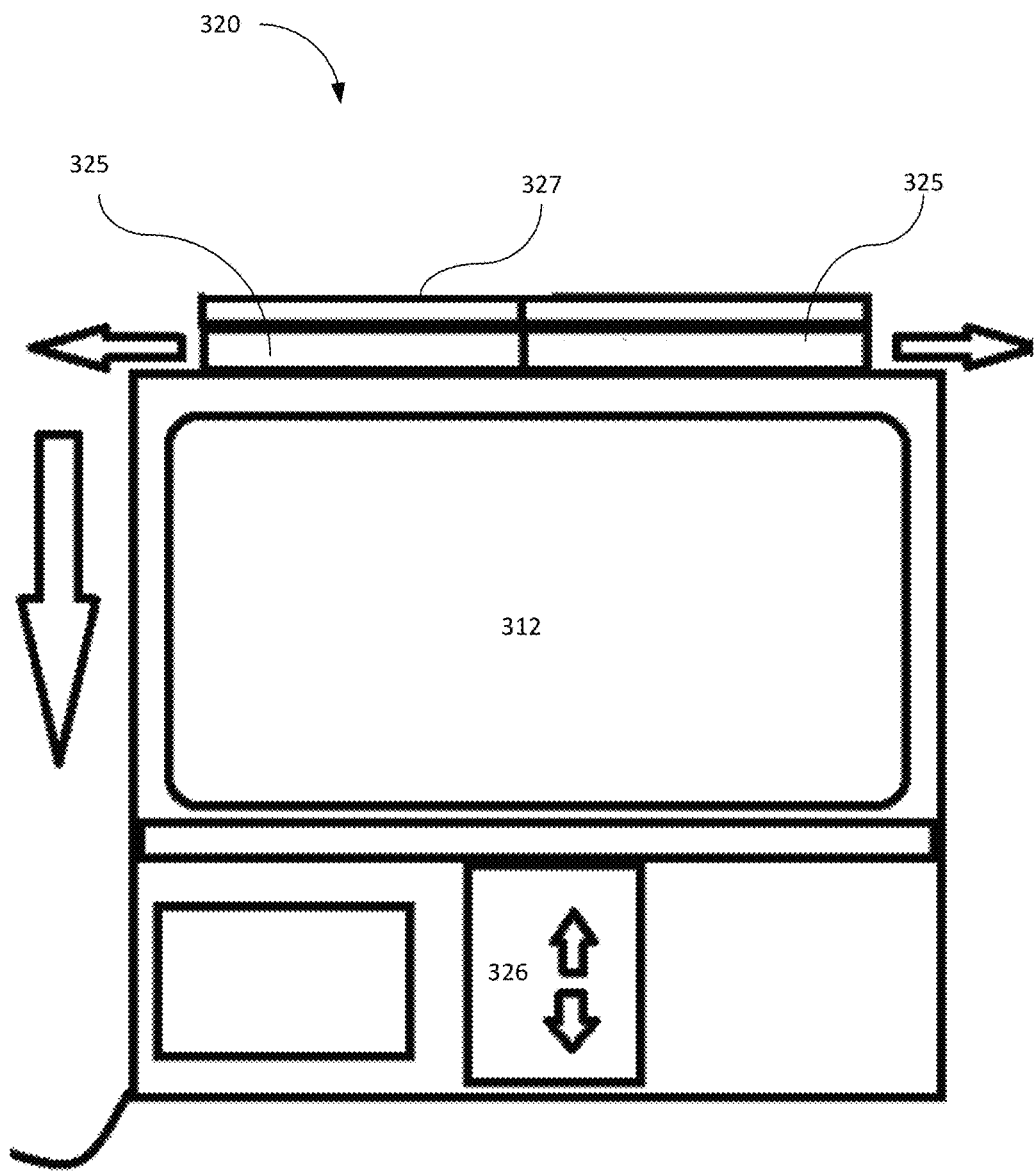
FIG. 3 is a block diagram of an exemplary PAGR appliance equipped with a Package Interaction System (PAGR-PIS) module for receiving and presenting packages from and to drones.

FIG. 3 depicts a drone landing platform 320, according to an embodiment. The drone landing platform 320 is equipped with a PAGR-PSS module and a lift mechanism 326 configured to raise and/or lowers packages 312 from a storage area to a package reception area (e.g., an area where the package back be picked up or dropped off by a drone and/or user). FIG. 3 further depicts two receiving doors 325 configured to slide open to provide access to the interior of the PAGR-PSS module. A charging platform 327 can be operable to supply power to a drone. The charging platform 327 can be, for example, an inductive charging mat, electrical contacts, or any other suitable charging mechanism operable to supply power to drones that have landed on the drone landing platform 320.

Figure 4:
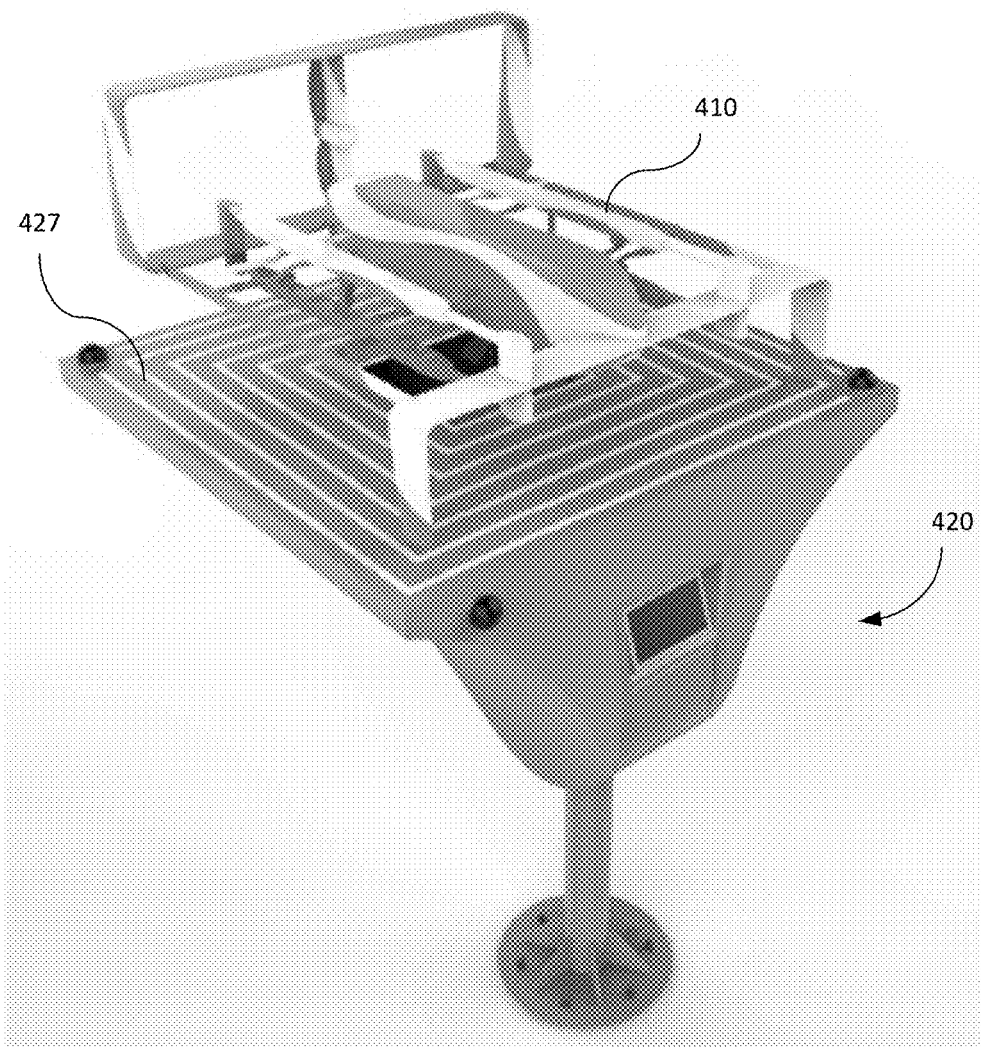
FIG. 4 is a perspective view of an exemplary PAGR appliance equipped with a Drone Refuel System (PAGR-DRS) module supplying electrical charging to a drone, according to an embodiment.

FIG. 4 is a perspective view of a drone landing platform 420, according to an embodiment. As shown, a drone 410 is parked on the drone landing platform 420. The drone landing platform 420 includes a PAGR-DRS module 427 operable to recharge the drone 410.

Figure 5:
FIGS. 5-7 are various views of a PAGR appliance mounted on a pole, according to an embodiment.
Figure 6:
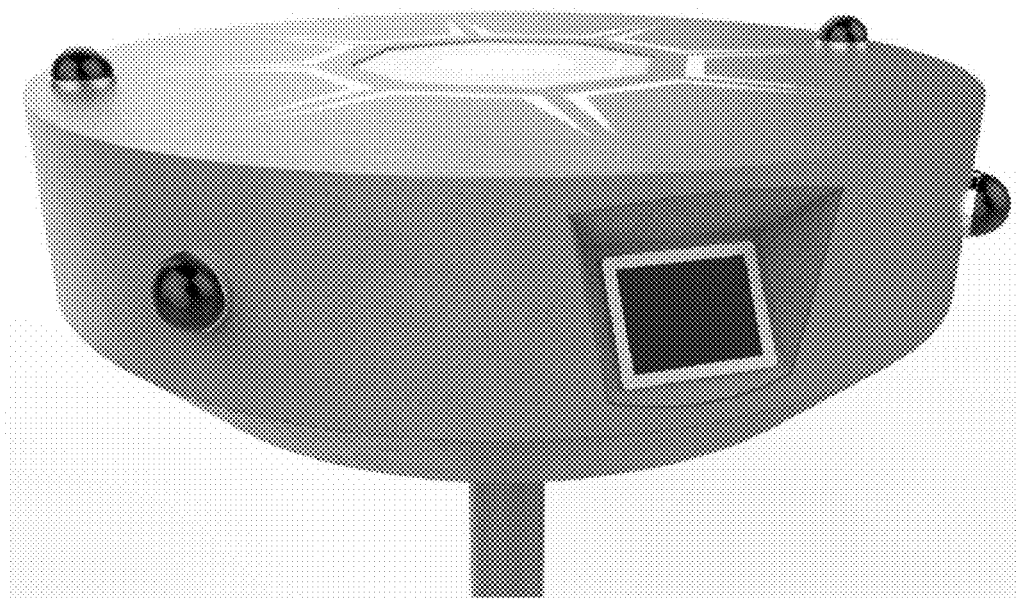
Figure 7:
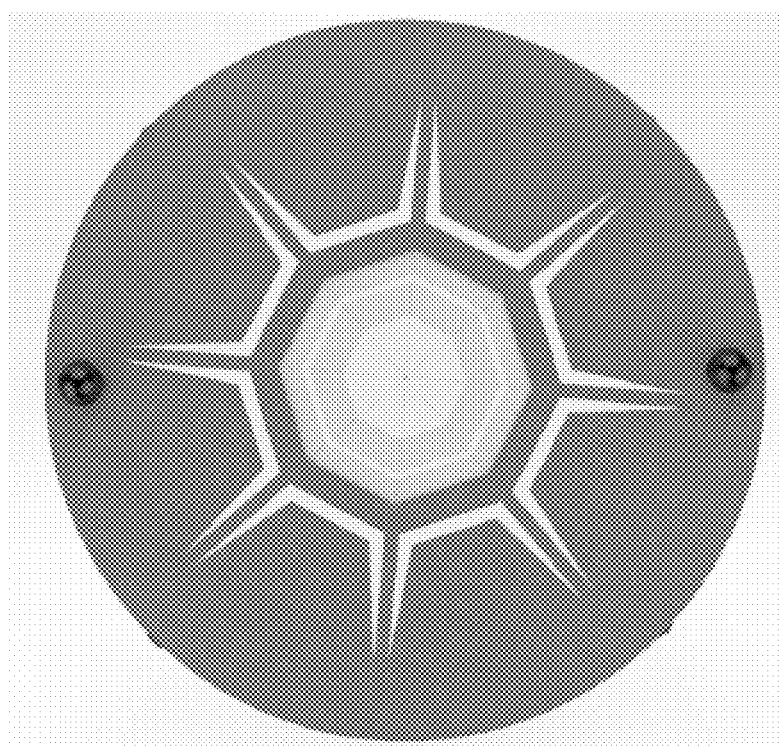

FIGS. 5, 6, and 7 illustrate a lower perspective view, a side perspective view, and a top view of a drone landing platform, according to an embodiment. The drone landing platform 520 is pole-mounted, which can facilitate access and installation.

Figure 8B:
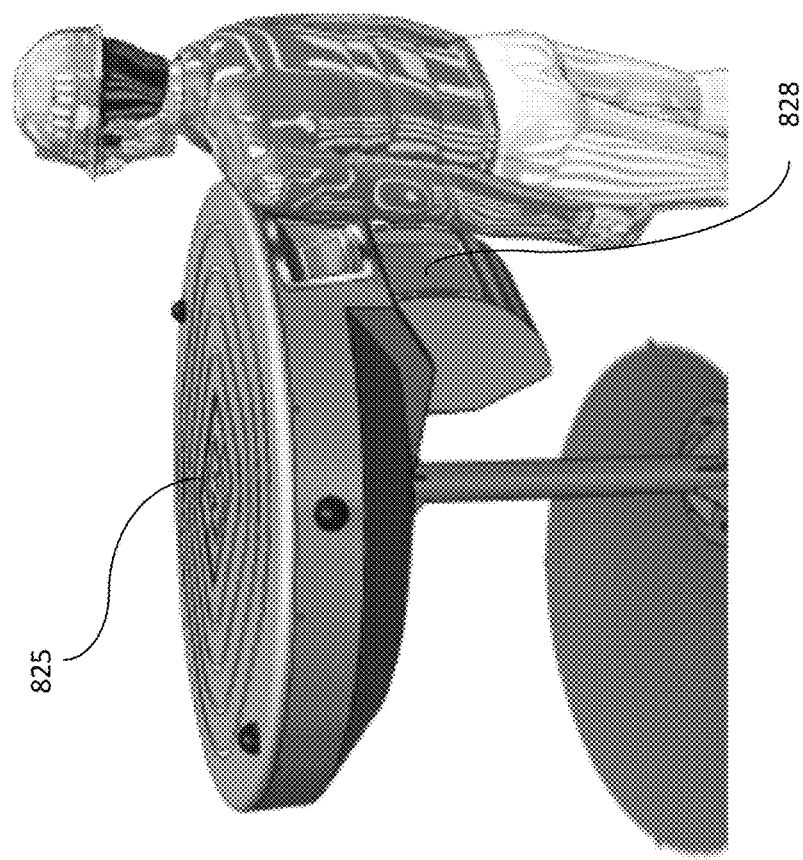
FIG. 8B depicts a customer retrieving a package from the PAGR appliance of FIG. 8A.
Figure 8A:
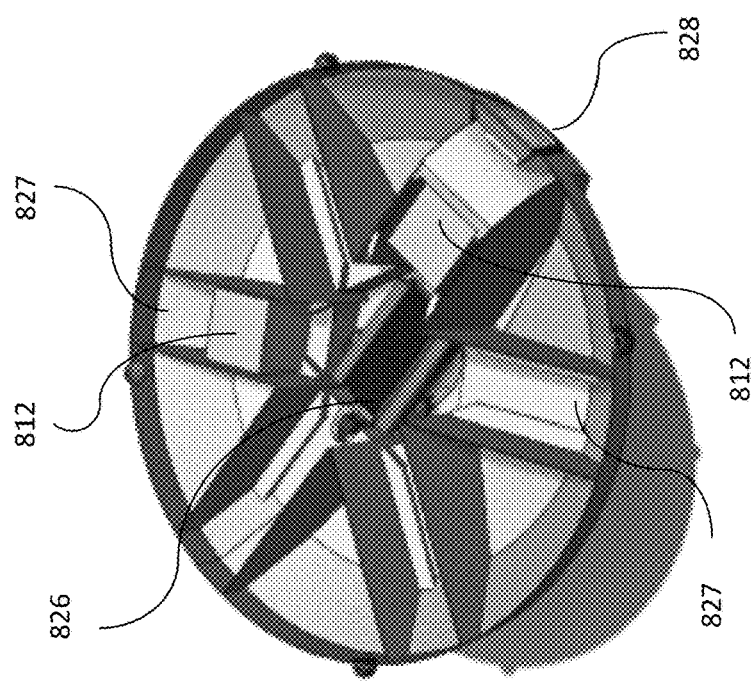
FIGS. 8A is a cut-away internal view PAGR appliance equipped with a 6-bay Package Storage System (PAGR-PSS) module, according to an embodiment.
Figure 9B:
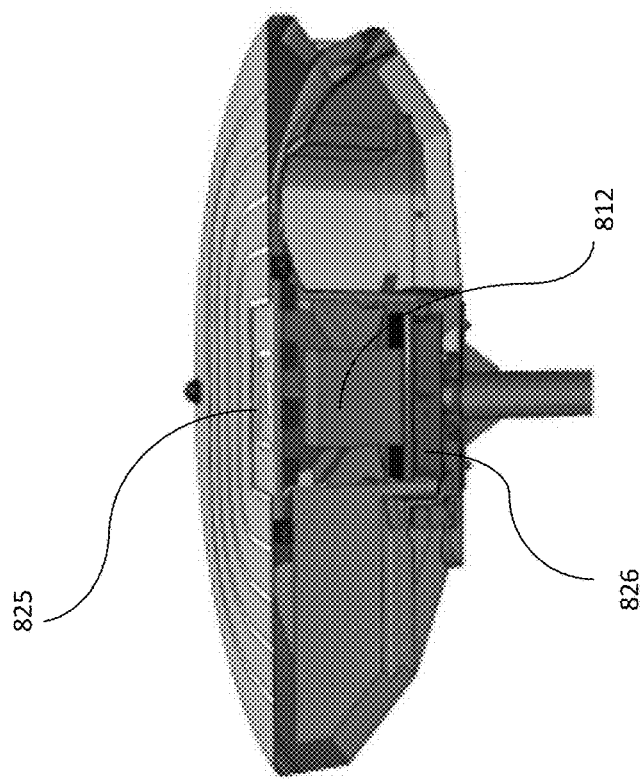
FIGS. 9A and 9B are cut-away side views of the PAGR appliance of FIG. 8A.
Figure 9A:
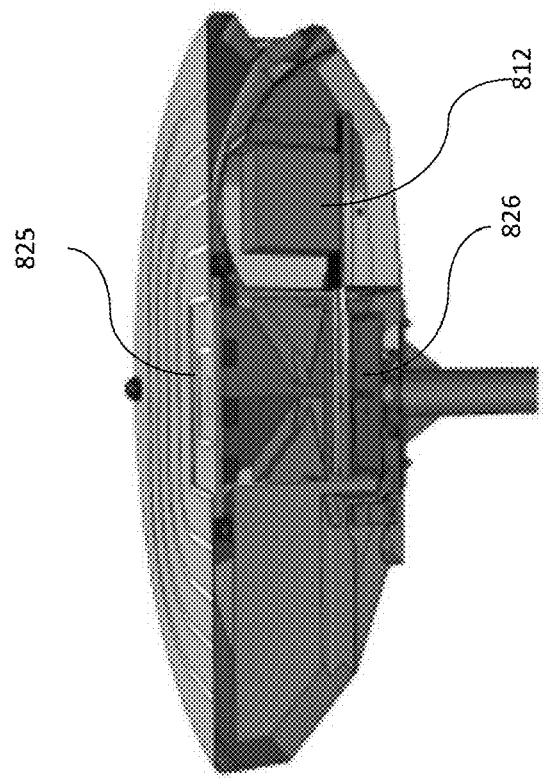

FIGS. 8A-9B depict a drone landing platform 820 be equipped with a PAGR-PSS module, according to an embodiment. FIG. 8A is a top perspective section view of the drone landing platform. FIG. 8B is a side perspective view of the drone landing platform 820. FIG. 9A is a side section view of the drone landing platform 820 with a package 812 is a first position. FIG. 9 B is a side section view of the drone landing platform 820 with the package 812 in a second position.

A hatch 825 disposed in a center portion of the drone landing platform is configured to accept a package 812 from a drone and/or provide a package 812 to a drone for pickup. A lift 826 disposed within the center portion can be operable to move packages through the hatch 825. The lift 826 can include a conveyor or other suitable mechanism operable to move packages on to and/or off the lift 826 and into and/or out of a bay 827 for storage. As shown, The PAGR-PSS module includes multiple bays 826; each bay can be configured to store a different package 812. The bays 826 can be rotated. In this way, a bay 826/package 812 can be moved into a load/unload portion of the PAGR-PPS module, where it can be transferred onto the lift 826. Furthermore, the PAGR appliance may present and accept packages to and from users by rotating a selected bay towards the user and unlocking an access door 828. Access door 828 may be unlocked upon verifying the user's identity (e.g., verifying that the user is the package recipient). While illustrated herein with six package bays, it is to be understood that the scope of the present disclosure is not so limited and that PAFR-PPS modules can include any number of bays (e.g., 3, 8, 15, etc.).

FIG. 10 is a signal diagram illustrating a method of operating a system that includes one or more drone landing platforms and a drone, according to an embodiment. At 910, a first drone landing platform can monitor its local environment. For example, the first drone landing platform can include one or more sensors operable to monitor conditions in the vicinity of the first drone landing platform. The first drone landing platform can analyze sensor data, for example to detect local, transient, and/or hazardous conditions. For example, machine learning techniques, such as neural networks and the like, may be employed to detect hazards, weather conditions, etc. A second drone landing platform can similarly monitor its local environment, at 915, and analyze sensor data to detect local, transient, and/or hazardous conditions in the vicinity of the second drone landing platform. It should be understood that drone landing platforms can monitor local environments and analyze sensor data continuously.

Optionally, the first drone landing platform and/or the second drone landing platform can send information related to their respective local conditions to a system management device, at 912 and 917, respectively. Similarly stated, in some embodiments, some or all processing and/or analysis of sensor data from one or more drone landing platforms can be offloaded to the system management device. Additionally, data gathered by multiple drone landing platforms can be aggregated to generate additional information of interest. For example, if high wind is measured at one drone landing platform, the system management device can reroute drones away from that drone landing platform due to locally hazardous conditions. If, however, high wind is measured at multiple drone landing platforms, the system management device may direct drones to land, seek shelter, return to base, or otherwise avoid a widespread hazardous condition.

In some embodiments, the system management device can dispatch the drone to a particular landing platform (e.g., the first landing platform), at 920. For example, the drone can be dispatched to deliver a package, pick up a package, recharge, and/or so forth. The drone and the first drone landing platform can engage in one-way and/or two-way communications, at 922. For example, the drone can initiate contact with a first drone landing platform and request permission to land. This request can include information about the package carried by the drone, such as the shipper's name and address, the package contents, requirements as to digital signatures, release of liability, secure storage, payment, the identity of the recipient, the address of the recipient, etc. In some instances, the first drone landing platform can respond with a negative acknowledgment (NAK), in which case the drone may depart the area without attempting to land. Although not shown in FIG. 10, in such an instance, the drone can return to base, contact the system management device for further/alternate instructions, enter into communications and attempt to land at the second drone landing platform, and/or take any other suitable action.

In an instance in which the first drone landing platform grants permission to land with a positive acknowledgment (ACK) and/or does not refuse permission to land, the drone may proceed towards landing. The drone may remain in communication with the first drone landing platform and continue to exchange information. For example, the drone may receive sensor data from the first drone landing platform regarding indications of local conditions, suggested landing approach patterns, drone location information such as range and angular position, flight path corrections, windspeed, obstacles, etc. Similarly stated, in some embodiments, the first drone landing platform can direct the drone to land such that the drone travels to the first drone landing platform based, at least in part on the local conditions detected by the first drone landing platform's sensors and/or information sent to the drone about the local conditions. The drone may reject some advisory information, for instance suggested landing location because of maneuverability limitations, and communicate this to the first drone landing platform, which may, in turn, respond with modified data. In some instances, the drone may choose not to land and again return to base, contact the system management device for further/alternate instructions, enter into communications and attempt to land at the second drone landing platform, and/or take any other suitable action.

As the drone approaches the first drone landing platform and prepares to land, at 930 the first drone landing platform may continue to monitor the local environment and continue to update the drone. The drone and/or the first drone landing platform can visually and/or audibly indicate that a drone landing is in progress by activating indicating and/or warning lights, strobes, horns, sirens, etc. These activations may be predicated on factors such as user preferences, time of day, and/or the detection of humans or animals in the vicinity.

In some instances, at 930, the drone can deliver a package to the first delivery platform. For example, the drone can place a package on an opening, lift, or hatch of the first delivery platform. The drone and/or the first delivery platform can transfer the package to a storage receptacle. For example, the first drone delivery platform may lower the package into an interior via a lift and/or transfer the package into a bay (e.g., via a conveyor). In some instances, at 930, the drone can pick up a package from the first drone landing platform. For example, the drone and/or the first drone landing platform can transfer a package from a bay and/or storage receptacle to a landing area, where the drone can attach itself to the package. In addition or alternatively, the first drone landing platform can recharge the drone, offer safe haven during adverse weather conditions and/or done malfunction, provide communication services, offer delayed takeoff for reasons of power conservation, air traffic management, etc.

The first drone landing platform and/or the system management device can notify the package recipient that a package communicate with the package recipient, at 932, for example, via text message, multimedia message, email, or smart phone app, etc. The package recipient, in response, can refuse or accept delivery, in some instances using a cryptographically secure digital signature. In an instance in which the package recipient refuses delivery before delivery of the package to the first drone landing platform is complete, the first drone landing platform can send a signal refusing delivery to the drone, which can cause the drone to abort the landing, as discussed above.

The package recipient can retrieve the package from the first drone landing platform. For example, the package recipient can approach the first drone landing platform and send a signal 934 via a smart phone app; in response, the first drone landing platform can unlock a bay or storage receptacle so that the package recipient can retrieve the package. Alternatively, the package recipient can enter a code into the drone landing platform via a keyboard or key pad, present identification to a camera or scanner, submit to biometric scanning and/or so forth.

A module as used herein refers to any combination of hardware, software, and/or firmware. As an example, a module may include hardware, such as a micro-controller, and a non-transitory medium to store code specifically adapted for execution on the micro-controller. Furthermore, in another embodiment, use of a module may refer to general purpose code running on a remote server farm consisting of commercially available general-purpose processors. Often module boundaries that are illustrated herein as separate will commonly vary and potentially overlap. For example, a first and a second module may share hardware, software, firmware, or a combination thereof, while potentially retaining some independent hardware, software, and/or firmware.

In various embodiments of the present disclosure, the methods described and illustrated may be performed in a different order, with illustrated boxes combined or omitted, with additional boxes added, or with a combination of reordered, combined, omitted, and/or additional boxes. Furthermore, method embodiments of the present invention are not limited to the specific methods illustrated herein nor to variations thereof. Many other method embodiments (as well as apparatus, system or other embodiments) not described herein are possible within the scope of the present invention.

Furthermore, the foregoing use of embodiment and other exemplary language does not necessarily refer to the same embodiment or the same example, but may refer to different and distinct embodiments, as well as potentially to the same embodiment.

Embodiments or portions of embodiments of the present invention may be stored on any form of a machine-readable medium. For example, all or part of a given method may be embodied in software or firmware instructions that are stored on a medium or memory readable by a processor or micro-controller. Also, aspects of the present invention may be embodied in data stored on a machine-readable medium, where the data represents a design or other information usable to fabricate all or part of this invention.

In the descriptions herein, numerous specific details are set forth, such as examples, specific hardware structures, specific architectural details, specific system components, etc. in order to provide a thorough understanding of the present disclosure. It will be apparent, however, to one skilled in the art that these specific details need not be employed to practice the present disclosure. In other instances, well known components or methods have not been described to avoid unnecessarily obscuring the present disclosure.

While the present disclosure has been described with respect to a limited number of specific exemplary embodiments, those skilled in the art will appreciate numerous modifications and variations therefrom. It is intended that the appended claims cover all such modifications and variations as fall within the true spirit and scope of this present disclosure. Upon studying this disclosure, it will be evident that various modifications and changes may be made thereto without departing from the broader spirit and scope of the invention. This disclosure is understood not to be limited to the specific constructions and arrangements shown and described, and the specification and drawings are, accordingly, to be regarded in an illustrative sense and not to be restrictive of the broad invention. Furthermore, the disclosed embodiments may be readily modifiable in arrangement and detail as facilitated by enabling technological advancements without departing from the principles of the present disclosure or the scope of the accompanying claims.

What is claimed is:
1. An apparatus, comprising:
 a sensor configured to detect a condition in a vicinity of a drone landing area, the sensor being stationary and ground-based;

a communication system; and a processor and a memory configured to:
apply a machine learning task to data collected from the sensor, the machine learning task operable to identify a typical condition of the vicinity of the drone landing area based on data collected by the sensor over a period of time and identify a transient hazard in the vicinity of the drone landing area based on based on a deviation from the typical condition in data collected by the sensor; and send a signal to the communication system to cause the communication system to transmit a warning of the transient hazard to the drone.

2. The apparatus of claim 1, further comprising a drone landing platform, the sensor mounted to the drone landing platform.

3. The apparatus of claim 2, further comprising a package storage receptacle configured to receive a package from the drone when the drone has landed on the drone landing platform.

4. The apparatus of claim 2, further comprising a charging module configured to provide energy to the drone when the drone has landed on the drone landing platform.

5. The apparatus of claim 1, wherein:
the transient hazard is a first hazard;
the machine is configured to detect a second hazard; and
the communication system is configured to send a signal to alert the drone to the second hazard.

6. The apparatus of claim 1, wherein:
the transient hazard is a first hazard;
the sensor is configured to detect a second hazard while the drone is grounded at the drone landing area; and
the communication system is configured to send a signal inviting the drone to remain grounded at the drone landing area while the second hazard is present.

7. The apparatus of claim 1, wherein the communication system is coupled to the sensor and is configured to transmit a flight plan to the drone.

8. An apparatus, comprising:
a drone landing platform;
a package storage receptacle configured to receive a package from a drone located on the drone landing platform;
a verification system configured to identify a user and provide access to the package upon identifying the user;
a sensor configured to detect transient hazards in a vicinity of the drone landing platform; and
a transmitter configured to transmit an indication of a transient hazard.

9. The apparatus of claim 8, further comprising:
a processor operably coupled to the sensor and the transmitter, the processor configured to analyze patterns of transient hazards to predict future hazards, the processor configured to cause the sensor to transmit an alert of a predicted future hazard.

10. The apparatus of claim 8, further comprising:
a processor mounted to the drone landing platform and configured to calculate a flight path for the drone and cause the transmitter to transmit the flight path to the drone.

11. The apparatus of claim 8, wherein the verification system is configured to identify the user after receiving a signal from the user's cellular phone.

12. The apparatus of claim 8, wherein the verification system includes a biometric sensor configured to identify the user.

13. The apparatus of claim 8, further comprising:
a conveyor configured to move the package from the drone landing platform into the package storage receptacle.

14. The apparatus of claim 8, further comprising a package verification system configured to capture an image of the package and transmit the image of the package to the user.

15. The apparatus of claim 8, further comprising a package verification system configured to:
capture an image of the package;
transmit the image of the package to the user; and
receive an indication of acceptance of the package from the user.

16. The apparatus of claim 8, wherein the sensor is mounted to the drone landing platform.

17. The apparatus of claim 8, wherein the sensor is configured to identify a typical condition of the vicinity of the drone landing area based on data collected by the sensor over a period of time and identify-a transient hazard in the vicinity of the drone landing area based on a deviation from the typical condition in data collected by the sensor.

18. A method, comprising:
receiving, from a drone, a request to deliver a package;
apply a machine learning task to data collected from a stationary sensor configured to detect a local condition in a vicinity of a drone landing area, the machine learning task configured to recognize a transient hazard in the vicinity of the drone landing area based on the transient hazard deviating from patterns of activity;
sending, to the drone, an indication of the local condition detected via the stationary sensor; and
directing the drone to land in a vicinity of the stationary sensor such that the drone travels to the vicinity of the stationary sensor based, at least in part, on the indication of the local condition.

19. The method of claim 18, wherein:
the stationary sensor is a first stationary sensor from a plurality of stationary sensors; and
receiving the request to deliver the package includes receiving a request to deliver the package to a vicinity of a second stationary sensor, the method further comprising:
receiving from the plurality of sensors, indications of conditions local to each stationary sensor;
applying the machine learning task to data collected from the plurality of sensors, the machine learning task operable to identify typical and hazardous configurations;
determining, using the machine learning task, that a hazardous configuration exists in a vicinity of the second stationary sensor from the plurality of stationary sensors, the drone directed to land in a vicinity of the first stationary sensor based on the determination of the hazardous condition in the vicinity of the second stationary sensor.

20. The method of claim 18, further comprising:
sending an approach path to the drone; and
receiving, from the drone, an acceptance of the approach path.

21. The method of claim 18, further comprising:
sending an approach path to the drone;
receiving, from the drone, a rejection of the approach path; and
sending, to the drone a modified approach path based on receiving the rejection of the approach path.

22. The method of claim 18, wherein the stationary sensor is a first stationary sensor, the method further comprising:
sending an approach path for the drone to land in a vicinity of a second stationary sensor; and
receiving, from the drone, a rejection of the approach path, the drone directed to land in the vicinity of the first stationary sensory based on the rejection of the approach path.

23. The method of claim 18, wherein the drone is a first drone, the method further comprising:
receiving, from a second drone, a request to land; and
sending, to the second drone, a negative acknowledgement such that the second drone is instructed not to land in the vicinity of the first stationary sensor.

24. The method of claim 18, further comprising sending, to the drone, a flight path for the drone to follow to land in the vicinity of the stationary sensor.

25. The method of claim 18, further comprising:
sending, to the drone, a flight path for the drone to follow to land in the vicinity of the stationary sensor;
receiving, from the drone and in response to sending the flight path information, a modified flight path; and
sending, to the drone an acceptance of the modified flight path such that the drone follows the modified flight path and lands in the vicinity of the stationary sensor.

26. The method of claim 18, further comprising:
receiving the package from the drone; and
transferring the package to a storage receptacle.

27. The method of claim 18, further comprising:
receiving the package from the drone;
transferring the package to a package storage receptacle;
receiving an indication that the recipient is present in the vicinity of the first sensor; and
providing a recipient access to the package storage receptacle.

28. The method of claim 18, wherein the drone is a first drone, the method further comprising:
receiving, from a second drone, a request to pick-up the package;
directing the second drone to land in the vicinity of the first sensor;
providing the package to the second drone; and
sending the second drone a flight path to a destination of the package.

29. The method of claim 18, wherein:
the request to deliver the package is received at a communication system coupled to the stationary sensor;
the indication of the local condition is sent by the communication system; and
the drone is directed to land by the communication system.

* * * * *